(12) United States Patent
Savoie

(10) Patent No.: US 6,859,809 B2
(45) Date of Patent: Feb. 22, 2005

(54) PROCESSING EDIT DECISION LIST DATA

(75) Inventor: Charles Savoie, Quebec (CA)

(73) Assignee: Autodesk Canada Inc., Quebec (CA)

( * ) Notice: Subject to any disclaimer, the term of this patent is extended or adjusted under 35 U.S.C. 154(b) by 365 days.

(21) Appl. No.: 10/087,321

(22) Filed: Mar. 1, 2002

(65) Prior Publication Data

US 2002/0080191 A1 Jun. 27, 2002

Related U.S. Application Data

(63) Continuation of application No. 09/123,945, filed on Jul. 28, 1998, now Pat. No. 6,381,608.

(30) Foreign Application Priority Data

Jul. 30, 1997 (GB) .............................................. 9716033

(51) Int. Cl.[7] .............................................. G06F 17/00
(52) U.S. Cl. .................... 707/102; 707/104.1; 345/726; 345/732
(58) Field of Search .............................. 707/102, 104.1, 707/101; 345/723, 724, 726, 730, 732; 386/52, 55; 348/722

(56) References Cited

U.S. PATENT DOCUMENTS

| 4,587,572 | A |   | 5/1986  | DiGiulio ....................... 386/95 |
| 5,206,929 | A | * | 4/1993  | Langford et al. ............ 345/723 |
| 5,553,221 | A | * | 9/1996  | Reimer et al. ............... 345/720 |
| 5,649,046 | A |   | 7/1997  | Stewart et al. ................ 386/52 |
| 5,649,171 | A |   | 7/1997  | Craven et al. ............... 395/500 |
| 5,659,793 | A |   | 8/1997  | Escobar et al. .............. 395/807 |
| 5,781,730 | A |   | 7/1998  | Reimer et al. ............... 709/203 |
| 5,801,685 | A |   | 9/1998  | Miller et al. ................. 345/302 |
| 5,808,628 | A |   | 9/1998  | Hinson et al. ............... 345/507 |
| 5,825,967 | A |   | 10/1998 | Stewart et al. ................ 386/52 |
| 5,930,445 | A |   | 7/1999  | Peters et al. .................. 386/52 |
| 5,930,446 | A |   | 7/1999  | Kanda .......................... 386/52 |
| 5,999,173 | A |   | 12/1999 | Ubillos ........................ 345/328 |
| 6,018,337 | A |   | 1/2000  | Peters et al. ................. 345/328 |
| 6,032,156 | A |   | 2/2000  | Marcus ........................ 707/104 |
| 6,034,679 | A |   | 3/2000  | McGrath ..................... 345/328 |
| 6,052,508 | A |   | 4/2000  | Mincy et al. .................. 386/96 |
| 6,061,758 | A |   | 5/2000  | Reber et al. ................. 711/100 |
| 6,118,444 | A |   | 9/2000  | Garmon et al. ............. 345/328 |
| 6,141,007 | A |   | 10/2000 | Lebling et al. .............. 345/339 |

FOREIGN PATENT DOCUMENTS

| EP | 0 526 064 A2 | 2/1993  | ......... G11B/27/028 |
| EP | 0 625 782 A2 | 11/1994 | ......... G11B/27/031 |
| EP | 0 803 873 A2 | 10/1997 |                       |
| GB | 2 312 081 A  | 10/1987 | ......... G11B/27/031 |
| GB | 2 294 355 A  | 4/1996  | ......... G11B/27/034 |
| WO | WO 93/21635  | 10/1993 | ......... G11B/27/028 |

* cited by examiner

*Primary Examiner*—Uyen Le
(74) *Attorney, Agent, or Firm*—Gates & Cooper LLP

(57) ABSTRACT

A processing system for processing data representing edit decision lists having edit decisions with edit data, representing the type of edit to take place, and frame range data, representing the frames over which the edit is to take place. An input device applies input data to the processing system in response to user manipulations specifying changes in the edit data. The processing device is configured to identify an associated function of the identified edit data, calculate modifications to the range data in response to the identified function and write the modified range data to storage.

18 Claims, 12 Drawing Sheets

Figure 8A

| | | | | | | |
|---|---|---|---|---|---|---|
| 025 | REEL1 | V | C | 02:31:42:01 | 02:31:42:11 | 00:02:14:05 | 00:02:14:15 |
| 026 | REEL2 | V | [C] — 801 | 00:14:36:10 | 00:14:36:20 | 00:02:14:16 | 00:02:15:02 |

| | | | | | | |
|---|---|---|---|---|---|---|
| 025 | REEL1 | V | C | 02:31:42:01 | 02:31:42:14 | 00:02:14:05 | 00:02:14:18 |
| 026 | REEL2 | V | D — 802 | 006 / 00:14:36:07 | 00:14:36:20 | 00:02:14:13 | 00:02:15:02 |

804, 807, 803, 809, 811

PROCESSING EDIT DECISION LIST DATA

This application is a continuation of application Ser. No. 09/123,945, filed Jul. 28, 1998, entitled "PROCESSING EDIT DECISION LIST DATA", now U.S. Pat. No. 6,381,608, issued Apr. 30, 2002, which application claims priority to United Kingdom application serial number 97 16 033.7 filed on Jul. 30, 1997, which applications are incorporated herein by reference.

FIELD OF THE INVENTION

The present invention relates to data processing apparatus, having input devices, a storage device, a processing device and output devices. The present invention also relates to a method of processing data representing an edit decision list, wherein said edit decision list has edit decisions with edit data and frame range data.

BACKGROUND OF THE INVENTION

In the post production of both cinemategraphic films and broadcast quality video, it is always necessary to perform a process of on-line editing in which the original source material is edited to produce the final result, which may in turn be used as a master from which final commercial copies are produced.

An of-line editing procedure allows an edited version to be produced without the risk of damaging the original source material. In this way, many possibilities may be considered before a final version is produced. In this way, it is possible to use off-line editing facilities to produce a list of edit decisions which may then be implemented in the final on-line process.

This procedure of performing an off-line edit followed by an on-line edit has been implemented within digital image processing systems, in which a relatively modest processing system may perform off-line edtiting, upon reduced resolution images, under the control of a graphical user interface. Thus, in this way, image frames may be presented to a user in any form considered appropriate whereafter the system will automatically generate an edit decision list, often recorded onto a standard floppy disc or similar data carrying medium.

An edit decision list may subsequently be used in a conventional editing facility or, alternatively, it may be used in a digital image processing facility at high definition. A system of this type is licensed by the present applicant under the trademark "FIRE". In this way, after an edit decision list has been produced, it would be possible to make modifications in an off-line system, resulting in the production of a new edit decision list or in an on-line system, where the on-line edits may be modified such that, in some respect, they differ from the edits proposed by the original list.

Both on-line environments and off-line environments require significant processing facilities and in some situations the level of editing required may be relatively minor. However, presently, unless an edit decision list is edited manually, which is difficult when most lists are only conveyed in machine readable form, it would be necessary to implement changes on a full editing system, which would usually incur significant facility costs and require the reloading of source material.

SUMMARY OF THE INVENTION

According to a first aspect of the present invention, there is provided data processing apparatus, comprising input devices, a storage device, a processing device and output devices, wherein said storage device is configured to receive data representing an edit decision list; said edit decision list has edit decisions with edit data and frame range data; an input device applies input data to said processing device in response to user manipulations specifying changes to said edit data; and said processing device is configured to identify an associated function of the identified edit data, calculate a modification to said range data in response to said identified function, and write said modified range data to said storage device.

In the preferred embodiment, the processing device is configured to identify a particular entry of an edit decision list in response to the position of the cursor displayed by an output device and said processing device is configured to determine a data type by determining the position of the data type with reference to line delimiters. Preferably, the processing device is configured to identify an associated function by reference to a look-up table.

According to a second aspect of the present invention, there is provided a method of processing data representing an edit decision list, wherein said edit decision list has edit decision with edit data and frame range data, said method comprising steps of loading an edit decision list into addressable memory locations; receiving input data in response to user manipulations of an input device identifying edit data and modifications to said edit data; identifying an associated function of the identified edit data; calculating a modification to said range data in response to said identified function and said user specified modification; and writing said modified range data to addressable storage locations.

Preferably, the edit data represents an edit type and said frame range data represents a range of source frames, wherein said edit type is modified resulting in modifications being made to said source range. Said edit type may represent a cut and said cut may be modified to represent a dissolve or a wipe. Preferably, the dissolve or wipe frames require input frames from two sources and said source range is modified to represent an overlap of frames for the duration of said wipe or said dissolve.

In a preferred embodiment, the edit data represents a unique line identifier and said frame range data represents a range of output destination frames, wherein said unique identifier is modified resulting in a modification to said destination range. The identified function may be a copy, resulting in edit decisions being copied to create additional uniquely identified lines and said destination ranges may be modified to specify new output images. The position of said new lines may be defined by a process of dragging and dropping an identified range of lines within the existing edit decision list.

Preferably, frame ranges are modified by performing calculations upon time codes defining frames in terms of hours, minutes, seconds and frame numbers.

BRIEF DESCRIPTION OF THE DRAWINGS

FIG. 8A illustrates an edit decision list having an identification of a cut being selected for modification to a dissolve;

FIG. 8B shows the edit decision list of FIG. 8A after the cut has been converted into a dissolve and range data has been modified in accordance with the present invention;

DETAILED DESCRIPTION OF THE PREFERRED EMBODIMENT

Figure 1:
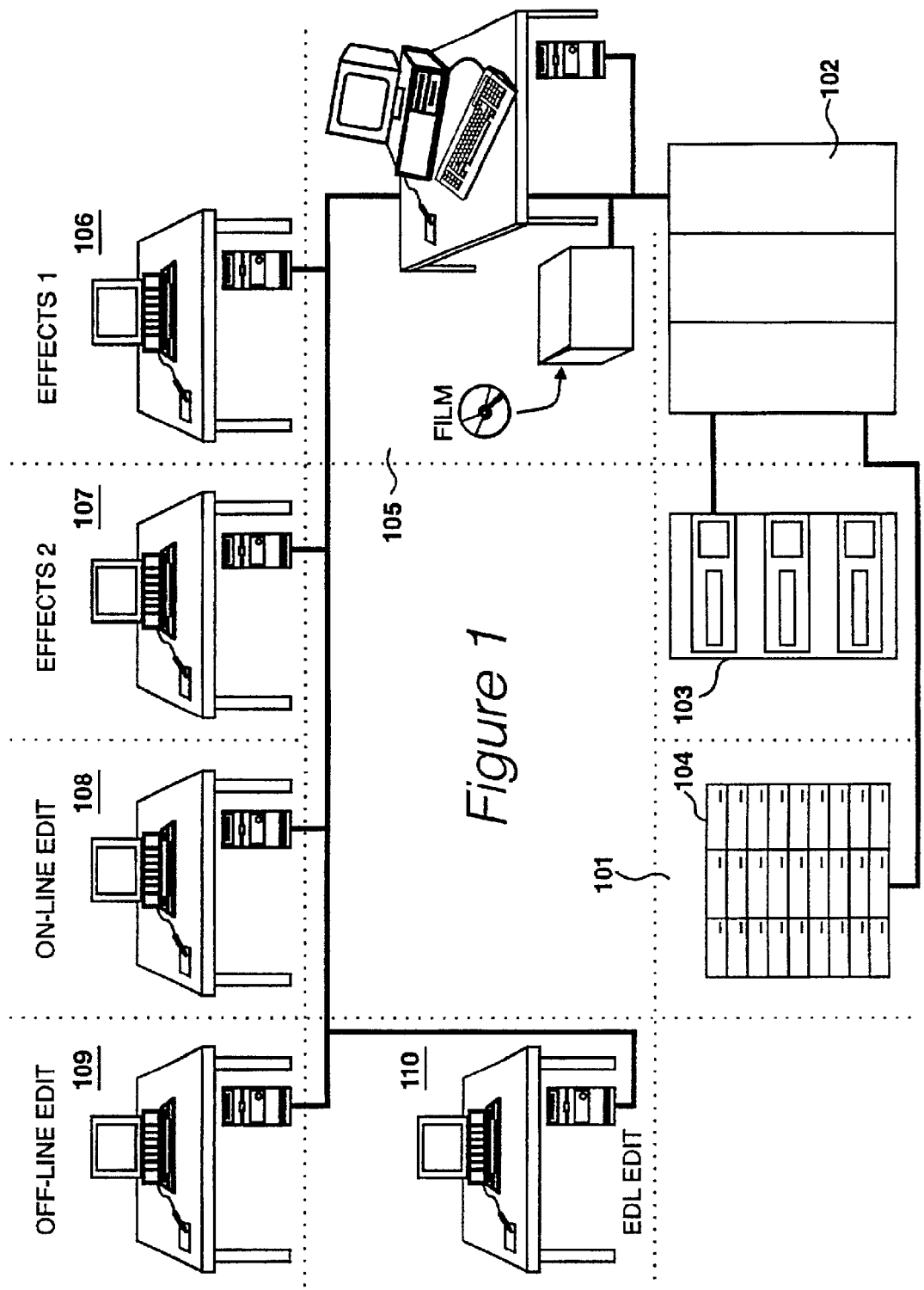
FIG. 1 shows a post-production facility house, including a facility for editing edit decision lists.

A post production facility house is illustrated in FIG. 1, having facilities for performing post production operations on broadcast quality video material, high definition video material and digitised cinematographic film.

The facility house includes a machine room 101 having a high performance computer 102 such as an "onyx" manufactured by Silicon Graphics Inc. Computer 102 is interfaced to a plurality of D1 digital video tape recorders 103 and a real-time frame storage device 104, configured as a redundant array of discs. Computer-executable instructions are loaded into computer 102 via a suitable computer-readable medium, such as a CD ROM. In response to these instructions, computer 102 is configured to provide post production functionality within the environment shown in FIG. 1.

In addition to the machine room 101, the facility house includes an image transfer facility 105, effects processing facilities 106 and 107, a full definition on-line editing facility 108, a reduced definition off-line editing facility 109 and a general purpose processing station 110 configured, amongst other things, to perform edits directly to edit decision lists, usually generated as the output from an off-line editing operation, possible performed by the off-line editing facility 109, prior to commencing an on-line editing session, possibly using on-line editing facility 108. Many stations similar to station 110 may be provided within the facility house and these stations may be used for general purpose data processing operations in addition to executing procedures specific to post production editing.

Figure 2:
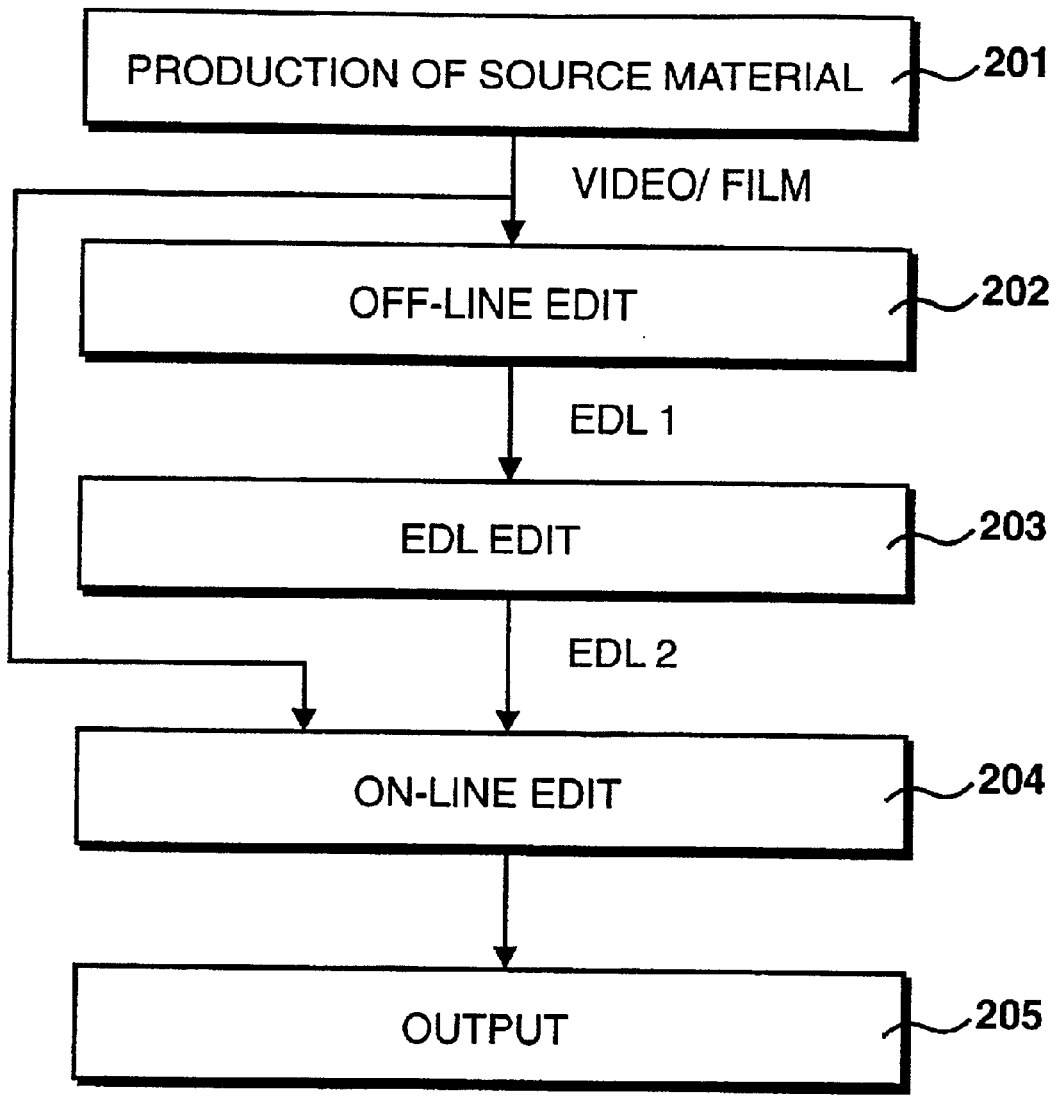
FIG. 2 illustrates editing operations performed by the facilities house shown in FIG. 1.

Procedures performed within the editing facility identified in FIG. 1 are illustrated in FIG. 2. At step 201 original source material is produced, either as cinematographic film or as video. If produced as cinematographic film, a digital video representation of this film may be produced by scanning the film at station 105.

At step 202 off-line editing is performed upon a low definition representation of the source material, resulting in the production of an edit decision list. Conventionally, this edit decision list may be used to create the final result as part of an on-line editing process. However, the facility shown in FIG. 1 allows further editing to be effected upon the edit decision list itself, whereafter further editing again may be performed within on-line suite 108.

After performing the off-line editing step 203, a first EDL, EDL 1, is supplied to the EDL editing facility 110 to perform EDL editing at step 204. A second EDL is produced from this process, represented as EDL 2 and this, in combination with the original source material, is supplied to step 205, allowing on-line editing to performed, possibly by on-line editing facility 108. Thereafter, at step 206 output video may be produced and recorded to appropriate video tape via a recorder 103. Alternatively, edits may be performed on cinematographic film or electronically manipulated material may be used to generate new image frames for conventional editing with the existing film stock.

Figure 3:
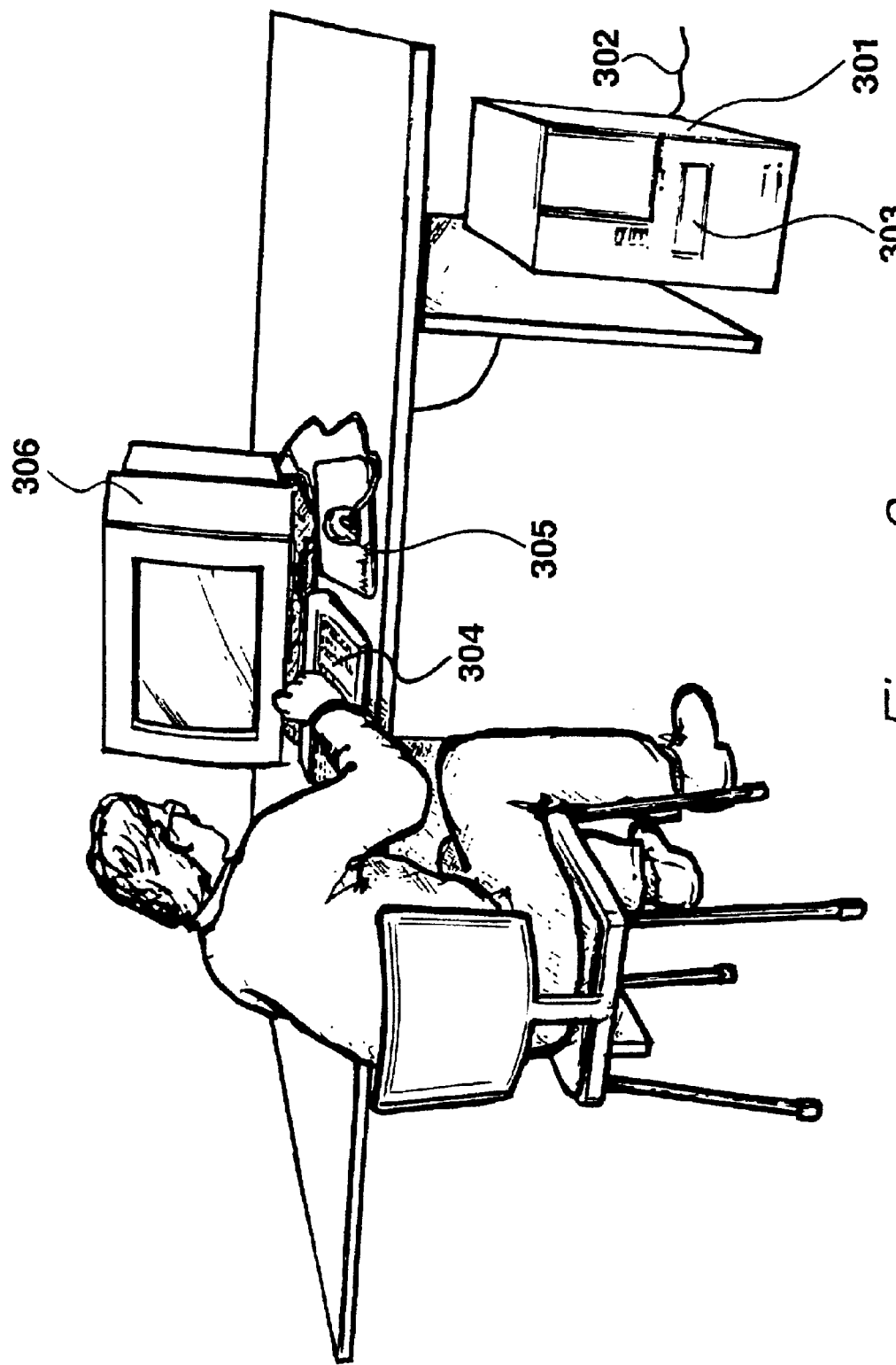
FIG. 3 details the edit decision list editing facility identified in FIG. 1, including a processing system and interface devices.

EDL facility 110 is detailed in FIG. 3 and includes a relatively modest processing system, such as a personal computer or an "O2" produced by Silicon Graphics Inc. Operational functionality is provided by computer 301 by receiving executable instructions conveyed by a machine-readable medium such as a CD ROM. Computer 301 may receive edit decision lists over a network cable 302 or, alternatively, edit decision lists may be supplied to the machine via a floppy disc receivable within floppy disc drive 303. The system is completed by operational instructions for effecting manipulations upon the edit decision list in response to manual manipulation effected by an operator. Thus, an operator is provided with a keyboard 304 and a mouse 305 or similar pointing device, in combination with a visual display unit 306.

Figure 4:
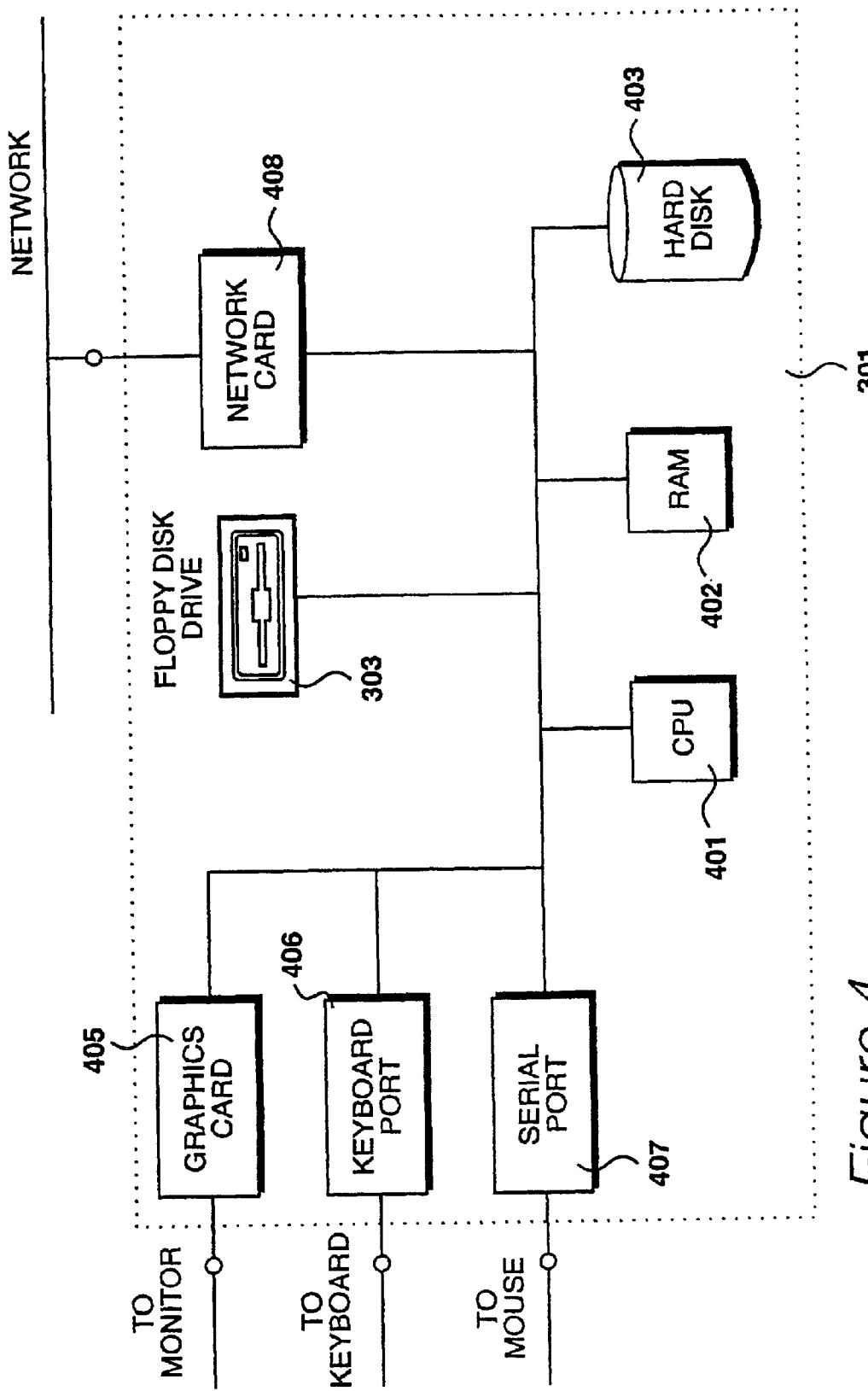
FIG. 4 details the processing system identified in FIG. 3, including a central processing unit, storage devices and interface cards.

A hardware environment for the processing system 301 is detailed in FIG. 4, in which a central processing unit 401 receives executable instructions from an associated randomly accessible memory 402. Some memory is also used for the temporary storage of data. Permanent storage is provided by a hard disc unit 403 and an internal addressable bus 404 provides communication to a graphics card 405 along with communication from keyboard port 406 and a serial port 407, these being connected to monitor 306, keyboard 304 and mouse 305 respectively.

The central processing unit 401 also communicates with its floppy disc drive 303 and a network card 408. The hardware shown in FIG. 4 is complemented by executable instructions in order to effect the EDL editing process 204 shown in FIG. 2.

Figure 5:
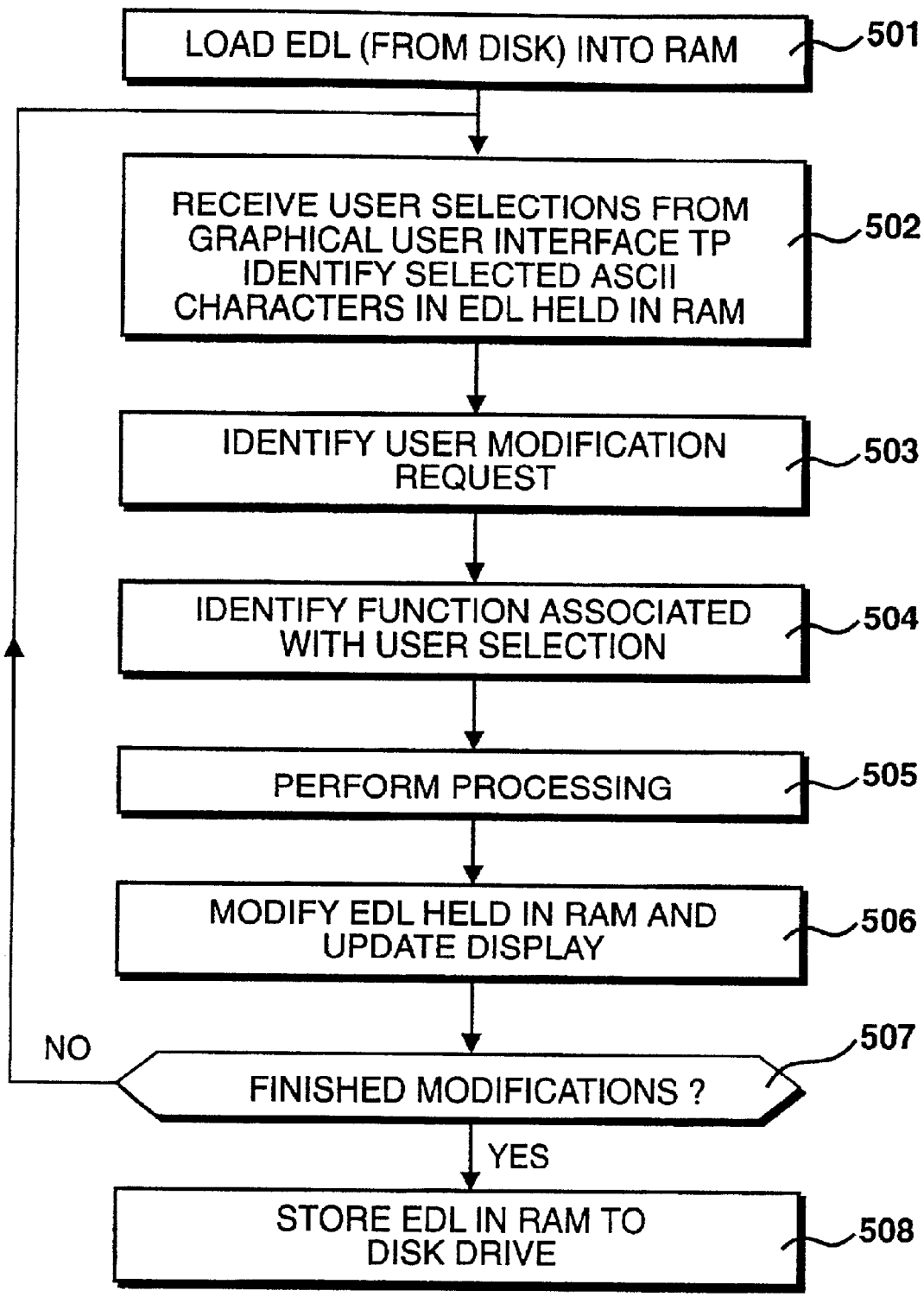
FIG. 5 details processes performed by the central processing unit identified in FIG. 4, including a process for identifying functions associated with a user selection.

Referring to FIG. 5, an edit decision list is written to random access memory 402 from disc drive 303 or via network cable 302 and network card 408. The edit decision list is presented to an operator by being displayed on the visual display unit 306.

In response to the edit decision list being presented graphically to a user, it is possible for the user to make particular selections, by operation of the mouse 305 to identify particular ASCII characters making up the edit decision list held in the random access memory 402.

Having selected a particular character within the edit decision list, the system, at step 503, identifies the user modification request and at step 504 the system identifies a function associated with the particular user selection. At step 505 the system performs processing appropriate to the selected function and thereby effects a modification to the edit decision list held in RAM at step 506.

At step 507 a question is asked as to whether modifications have been finished and if answered in the negative, control is returned to step 502. If, at step 507, a detection is made to the effect that the modifications have been finished, resulting in the question asked at step 507 being answered in the affirmative, the edit decision list is transferred to the local hard disc drive 403 and, if required, written to a floppy disc drive or written back to the network array.

Figure 6:
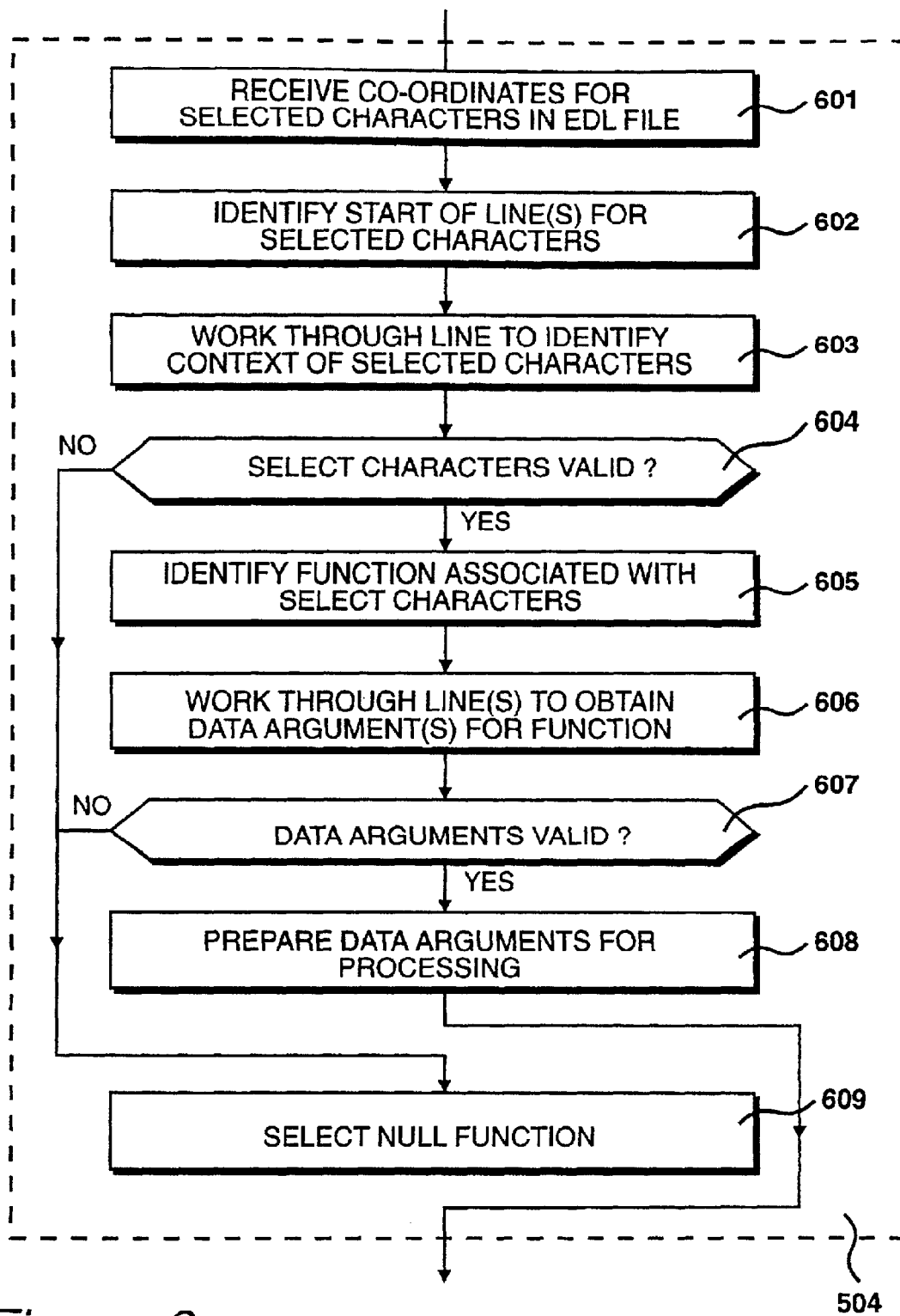
FIG. 6 details the identification step included in FIG. 5.

Step 504 for the identification of a function associated with a user selection is detailed in FIG. 6. A manual operation of the mouse 305 (or similar pointing device) results in movement of a cursor which is viewable by means of the visual display unit 306. XY movements of the mouse are detected which are then converted into character positions upon the screen. After making a particular character selection, forming part of the EDL, the coordinates for the selected characters are received by the processing system at step 601.

At step 602 the edit decision list is analysed by tracking back, character by character, until the start of line is identified for the particular selected characters.

At step 603, the process works through the line of characters to identify the context of the particular selected characters and at step 604 a question is asked as to whether the selected characters are valid. The selected characters are considered to be valid if they form part of an actual edit decision. Thus, the characters will be considered as being invalid if they merely relate to a comment or other non-edit directed text string. This results in the question asked at step 604 being answered in the negative and control being directed to step 609. At step 609 a null function is selected, thereby insuring that no further processing is performed upon invalid data.

When the question asked step 604 is answered in the affirmative, the particular function associated with the selected characters is identified. This identification is made based upon the position of the selected characters within the edit decision line.

At step 606 further processing of the decision line is performed in order to obtain data arguments for the associated function detected at step 605.

At step 607 a test is performed to determine whether the data arguments are valid and if this question is answered in the negative control is again directed to step 609.

If the question asked at step 607 is answered in the affirmative, data arguments are prepared for processing at step 608, possibly involving procedures such as translating an ASCII encoded number into a numerical representation, whereafter control is directed to step 505.

The processing of the edit decision list considers the list as having lines of edit decisions, wherein each of said lines may be considered as being made up of edit data and frame range data. Edit data will represent a unique line entry for the edit decision, a source reel, a data type and an edit type. Thus, for example, the data type may distinguish between video data and audio data and an edit type may identify the type of edit, which may take the form, typically, of a cut, a dissolve or a wipe. The frame range data will identify a range of frames for the input source and the destination output and therefore represents a range of frames lying within the source reel or, ultimately, making up part of the output reel.

The edit decision list is loaded into addressable memory locations as previously described and input data is received in response to user manipulations of the mouse, or similar device, to identify edit data. Thus, in response to manual operations of the mouse, particular items of edit data may be selected, such as, line entries or edit types. When a selection of this type has been made, an associated function is identified. Thus, having identified a particular data type within the edit data, it is possible to perform particular types of functions depending upon the particular type of edit data selected. Having made an identification of this type, the system is configured to modify range data by calculating an appropriate modification in response to the identified function and in response to a user specified modification. Thereafter, the modified range data is written to an addressable storage location.

In this way, it is possible for an operator to perfect powerful editing manipulations without the recourse to the full off-line editing facility or the full on-line editing facility. Furthermore, in some environments, facilities of this type may not readily be available or, as is often the case within a facility house, are being used for other purposes. Thus, the provision of an EDL editing facility allows the use of more powerful stations to be optimised and for the overall throughput of the facility to be increased.

Edit decision lists define edit decisions using ASCII characters in the form of a series of lines delimited by carriage return characters. Each line of the edit decision list containing edit data includes fields delimited by character spaces. Thus, an entry position along the line may be determined by counting the number of character spaces and the start of the line may be determined by the position of the nearest carriage return.

Figure 7:
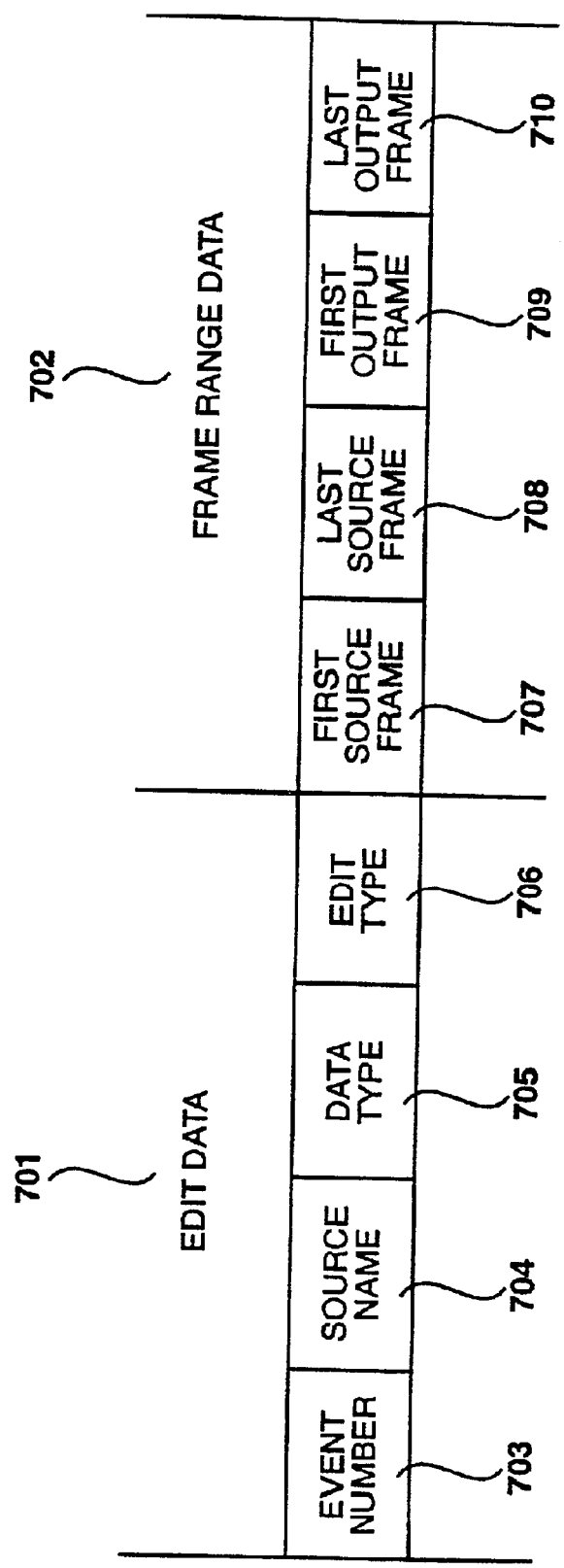
FIG. 7 identifies the structure of an edit decision list processed by the environment identified in FIG. 3.

As shown in FIG. 7, a line of an edit decision list may be considered as being made up of two portions; portion 701 representing edit data and portion 702 representing frame range data. The edit data 701 is initiated by a unique event number 703 and edit lines are contained within the list in sequential event number order. The event number entry or field 703 is followed by a source name field 704 which identifies a source reel of input material, usually in the form of digital video tape. This is followed by field 705 which identifies the data type being made up of either video or audio. This is followed by an edit type field 706 which details how the particular clip under consideration, identified by source name 704, is to be connected to the previous clip. In its simplest form, the edit type identifies a cut but in more sophisticated systems the edit type may represent a wipe, a dissolve or a particular special effect.

The frame range data 702 only contains time codes and it is this area where significant calculation is required in order to ensure that the correct time code entries are made. Frame range data includes an identification of the first source frame 707, followed by an indication of the last source frame 708. These are in turn followed by an identification of the first output frame 709 and, finally the frame range data includes an indication of the last output frame 710. Frame references 707 to 710 are all defined as time codes, specifying hours, minutes, seconds and frame number. The number of frames present during each second of the clip will vary depending upon the particular standard concerned. Thus, for example, cinematographic film will typically contain 24 frames per second, PAL video will contain 25 frames per second and NTSC video will contain 30 frames per second.

The embodiment provides an environment in which qualitative amendments may be made to the edit data resulting in quantitative modifications being made to the frame range data, so as to maintain the overall integrity of the edit decision list. Two particular examples of these operations will be detailed although it should be appreciated that other functional operations are possible based on this underlying principle.

In a first example, an operator selects the edit type field 706 and performs a conversion, usually converting a cut into a dissolve or a wipe. Such a conversion is difficult to implement, because a situation in which a clean break occurs from one source to another source is modified such that an overlap of frames occurs in order for the wipe or the dissolve to be implemented. In a second example, event numbers are modified by effectively making a copy of lines of the edit decision list. In the example, several lines of the edit decision list may be selected under manual control and, as is known, in conventional graphical user interfaces, a selected portion of the edit decision list is dragged and dropped, under the operation of the mouse 305. The operation effectively renumbers lines of the edit decision list, modification to event numbers 703 of the edit data 701, and the system is required to re-calculate new output frame numbers, specified at fields 709 and 710.

An example of the procedure for converting a cut decision into a dissolve decision is shown in FIG. 8A and FIG. 8B. Initially, the edit decision list illustrated in FIG. 8A is displayed on visual display unit 306. An operator places a cursor 801 over the edit type C of event 026 and depresses key "D" on keyboard 304, informing the process that the cut at line 026 is to be converted to a dissolve. After striking an enter key on keyboard 304, the operator enters the number of frames present in the dissolve which, in this example, has been entered as a six frame dissolve. On striking the enter key again, the edit decision line 026 is modified to that shown in FIG. 8B. Thus, as shown in FIG. 8B, the cut identified by cursor 801 has been converted to a D 802 indicating that the edit type is a dissolve and not a cut. This is followed, in accordance with convention, by a number 803 representing the number of frames present in the dissolve which, as shown in FIG. 8B, has been represented as 006, indicating a six frame dissolve.

However, in addition to making these modifications to the edit data, in accordance with the present invention, modifications have also been made to the frame range data. Furthermore, these modifications, in addition to being made to edit decision line 026, have also been made to the previous line 025.

Figure 9:
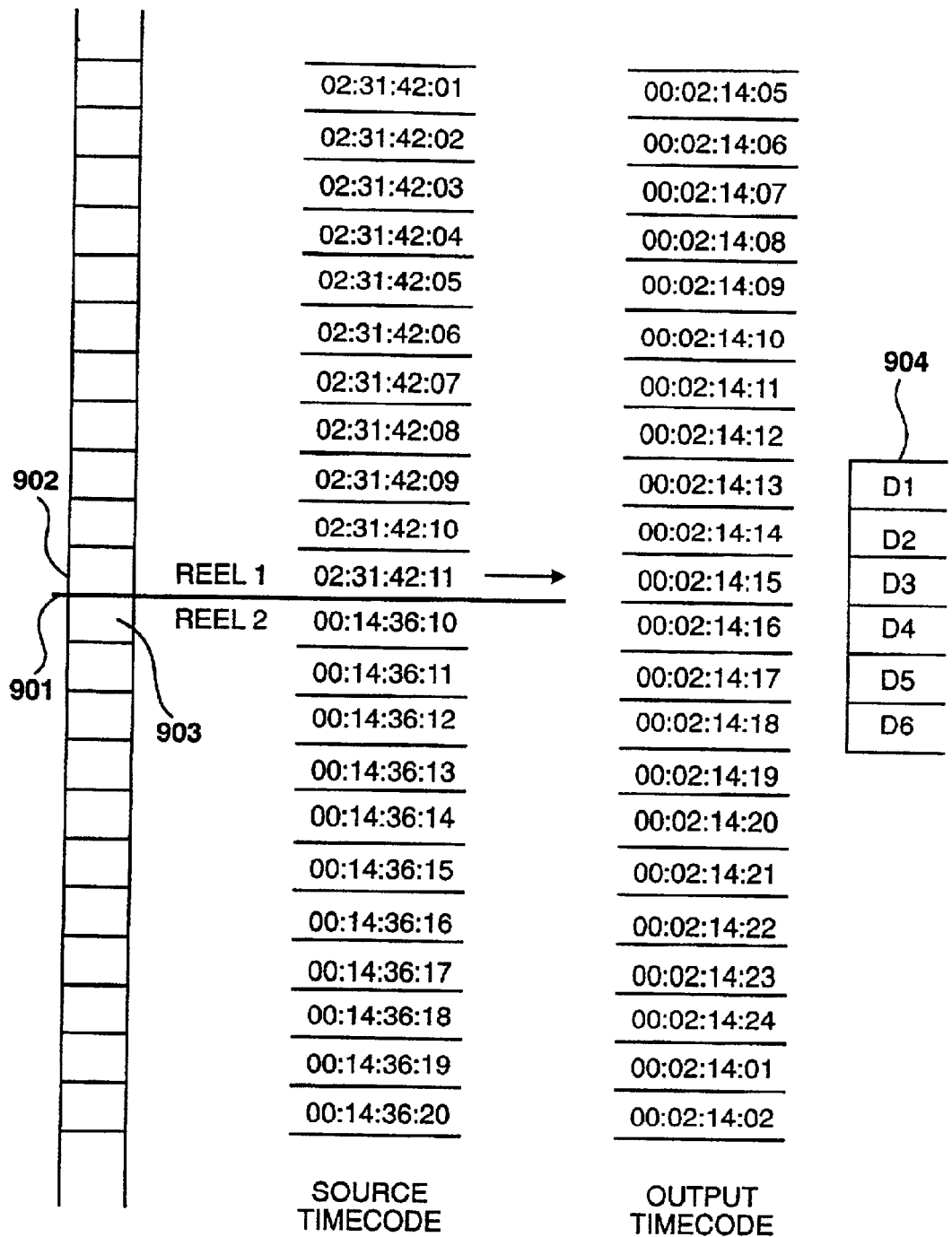
FIG. 9 illustrates the operation performed when converting the edit decision list of FIG. 8A representing a cut to the edit decision list of FIG. 8B representing a dissolve.

The nature of the dissolve is illustrated in FIG. 9. A cut point, as defined by line 026 of the EDL in FIG. 8A, is indicated by line 901. Frames 902 above cut line 901 are derived from reel 1, with frames 903 below cut line 901 being derived from reel 2. The last frame 902 of reel 1 is identified by time code 02:31:42:11:, as specified by the last source frame in edit line 025 of FIG. 8A. After the edit has been made, this frame effectively becomes frame 00:02:14:15: of the output frame, as identified by the last output frame field in line 025 of FIG. 8A.

The next frame in the output reel is given the next consecutive time code, namely 00:02:14:16:, which is derived from frame 00:14:36:10: of reel 2, as specified by line 026 of FIG. 8A.

The six frame dissolve is illustrated at 904, consisting of six frames D1 to D6 in which output data is derived from two source frames. Thus, when a dissolve of this type occurs, it is no longer possible to specify a clean cut as cut line 901 and a degree of overlap must occur such that, before the system stops obtaining frames from reel 1, the system commences obtaining frames from reel 2. Thus, during the dissolve period, two source frames are considered and merged in varying amounts in order to provide the dissolve effect. A similar situation arises when a wipe is defined in which the proportion of the image increases gradually from one source to the other. Thus, a dissolve may be considered as a gradual transition of all of the pixels whereas a wipe consists of a sudden transition which occurs over parts of the image for the wipe duration.

In order to perform the dissolve, the position of the source reels remains the same relative to the output time code.

Thus, output frame 00:02:14:16 will still be derived from input frame 00:14:36:10 of reel 2. However, in addition, it will also contain a proportion of the next frame from reel 1, namely 02:31:42:12, a frame which was not present in the original cut edit. Thus, in order to achieve a dissolve it is necessary for handles of appropriate length to be present within the stored clip so that some of the previously unrequired frames may be introduced into the final edit.

The period of the dissolve, frames D1 to D6, is positioned centrally about the notional cut point, in accordance with convention. It is possible to move the location of the dissolve although this is more readily achieved by first moving the position of the cut and then defining a dissolve which is positioned centrally about the new cut position. In this way, in order to provide a six frame dissolve, it is necessary for a further three frames to be derived from reel 2, preceding frame 00:14:36:10 and for a further three frames to be derived from reel 1 following after frame 02;31:42:11. This needs to be reflected in the last source frame field 708 of reel 1 (line 025) and in the first source frame field 707 of reel 2, line 026. Thus, as shown in FIG. 8B, the last input frame defined by timecode 804 has been modified compared to the equivalent time code at location 805. In particular, three frames have been added such that this clip will terminate at frame 02:31:42:14. This is also reflected in the last output frame field 710, such that time code 806 has also been increased by three frames as represented by time code 807 in FIG. 8B.

At line 026 it is necessary to advance the first source frame from time code 00:14:36:10, as shown by time code 808, to 00:14:36:07, as shown by time code 809. Similarly, on the output side, the first output time code has been advanced from 00:02:14:16 as shown at 810, to 00:02:14:13 as shown at 811.

Figure 10:
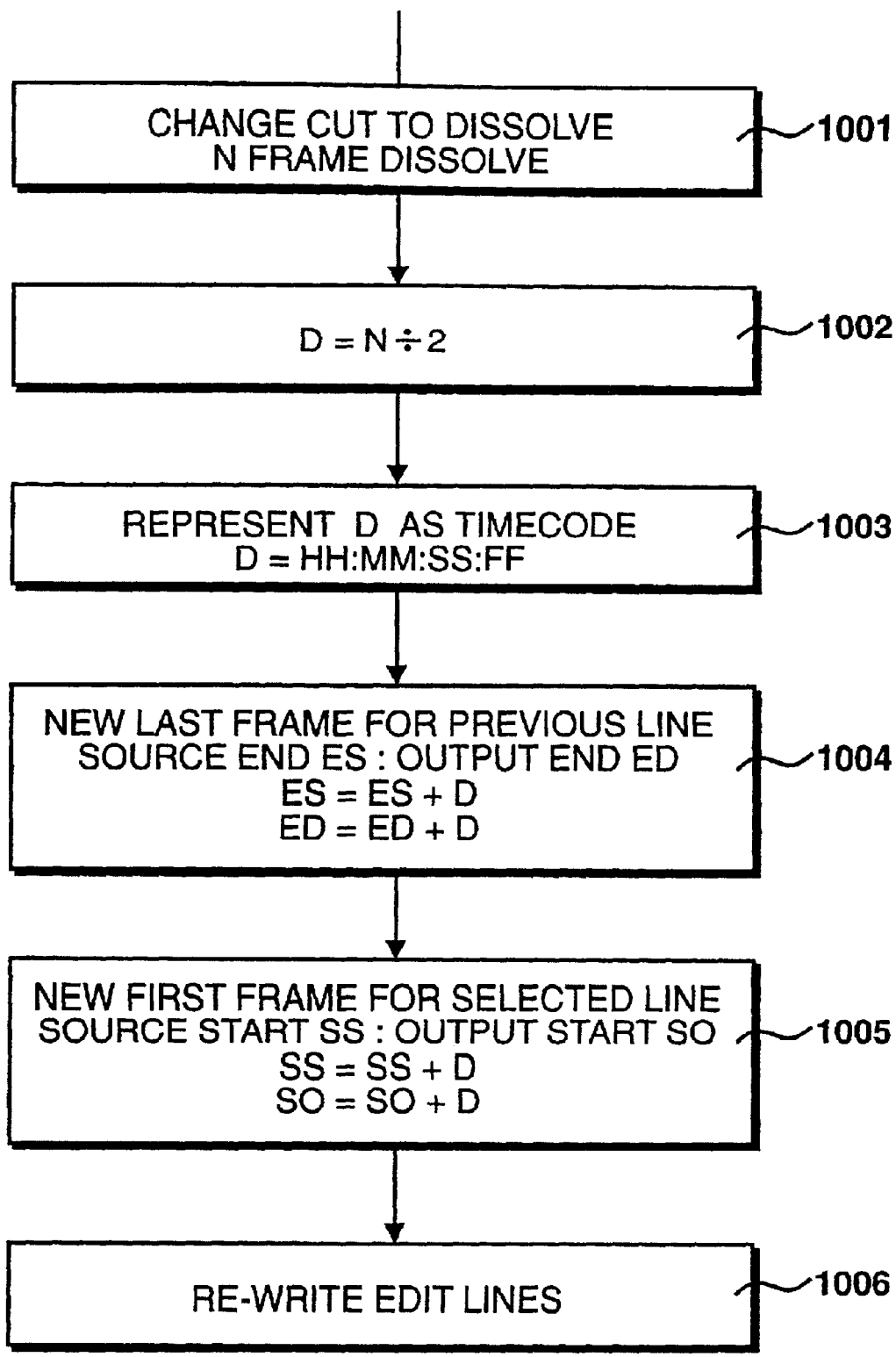
FIG. 10 illustrates the function called to re-calculate edit decision range data.

On detecting an operation to the effect that a cut is to be converted into a dissolve, the system refers to a look-up table to identify a function which will perform the required editing to the edit decision list. The function called by this operation is shown in FIG. 10 and process 1001 includes the step of identifying the situation to the effect that the cut is to be changed to an N frame dissolve where N equals 6 in the previously described example.

As described with reference to FIG. 9, the six frame dissolve results in an additional three frames being required from each of the two input sources. Thus, at step 1002 the dissolve depth D is calculated by dividing the number of frames N making up the dissolve by two.

Calculations in time code need to be done in the appropriate time code base which is represented as hours, minutes, seconds and frame numbers. Thus, calculations must be performed on the basis that 60 minutes are present within each hour, 60 seconds are present within each minute and 24, 25 or 30 frames are present each second etc. depending upon the particular type of material being considered. Thus, at step 1003 the dissolve depth D calculated at step 1002 is converted into a time code representation.

At step 1004, new time code values for the previous line are calculated. The last source frame 708 is identified as the source end ES and the last output frame 710 is identified as the output end EO. Each of these values is increased by the value D, such that the new value for ES equals ES plus D and the new value for EO equals EO plus D, all of these calculations being performed in the time code base.

A similar operation is performed for the selected line at step 1005. Thus, the first source frame 707 is identified as the source start SS and the first output frame is identified as the output start SO. Again, the dissolve depth D is added to each of these values such that the new value for SS equals SS plus D and the old value for SO equals SO plus D. At step 1006 the newly calculated values are re-written as edit lines, as shown in FIG. 8B.

Figure 11:
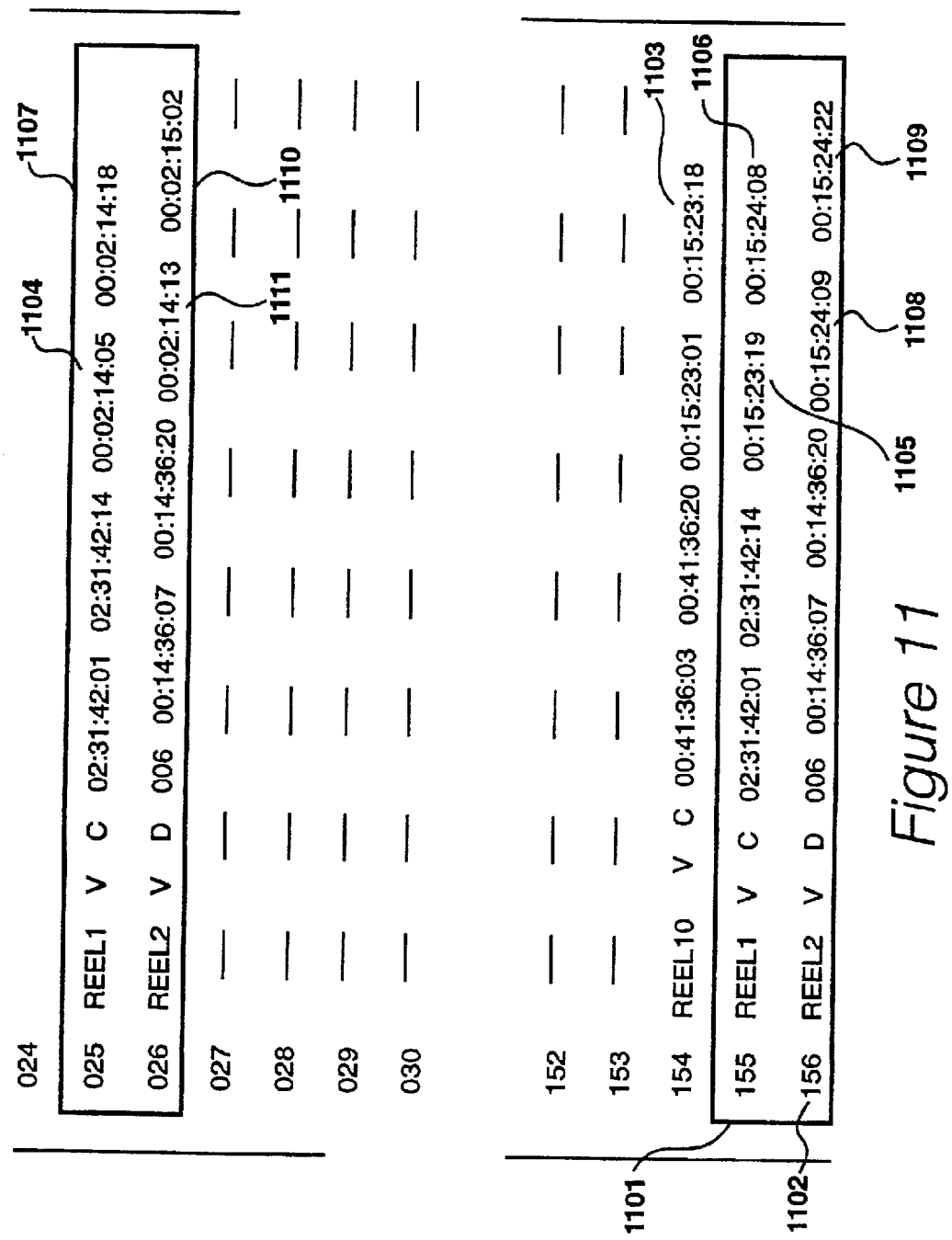
FIG. 11 illustrates an operation of copying edit decision list data with range data being re-calculated.

The procedure of dragging and dropping time code entries is illustrated in FIG. 11. In this example, lines 025 and 026, which were previously modified to convert a cut into a dissolve, are now copied such that similar events occur after event 154. If performed, for example, under a conventional text editor, the dropping of line 025 after line 154 would result in a line retaining its event number as 025. In accordance with edit decision list protocols, this would have no meaning in that this particular event has already been put in place and would merely result in a repetition of work that has already been done during the on-line process.

The dragging and dropping of identified lines within the edit decision list, in accordance with the present invention, results in the updating of the event number field 703 within the edit data such that, on dropping these events, the event numbers are modified to the next available numbers, shown at 1101 and 1102 which are 155 and 156 respectively in this example. Thus, in accordance with this procedure, the edit data has been modified and the system is now required to make appropriate amendments to the frame range data.

In this situation, the source material remains the same but the time code location of the output material should be contiguous with the rest of the edit decisions. Thus, the last output frame field 710 shown by time code 1103 represents the end of the output source material prior to the copying being effected. In the example shown, this gives a time code of 00:15:23:18, such that the next frame will be given time code 00:15:23:18.

In the copied time code, the first output frame of line 025 has the value of 00:02:14:05, shown at time code location 1104. As shown at time code location 1105, this value has been replaced with the required value 00:15:23:19.

The size of the clip remains the same, therefore the last output frame field 710, represented by time code 1106 is also modified to 00:15:24:08. Thus, the difference between these values is equivalent to the difference between values indicated at 1107 and 1104. However, the clip is now continuous with the earlier edits.

Similar modifications are made to line 156, such that the first output frame field 709, shown as time code location 1108 is made contiguous to the value at 1106. Similarly, the last output frame indicated by time code 1109 is updated such that the difference between time codes 1109 and 1108 is the same as the difference between the timecodes in the source line 026, identified as 1110 and 1111.

Figure 12:
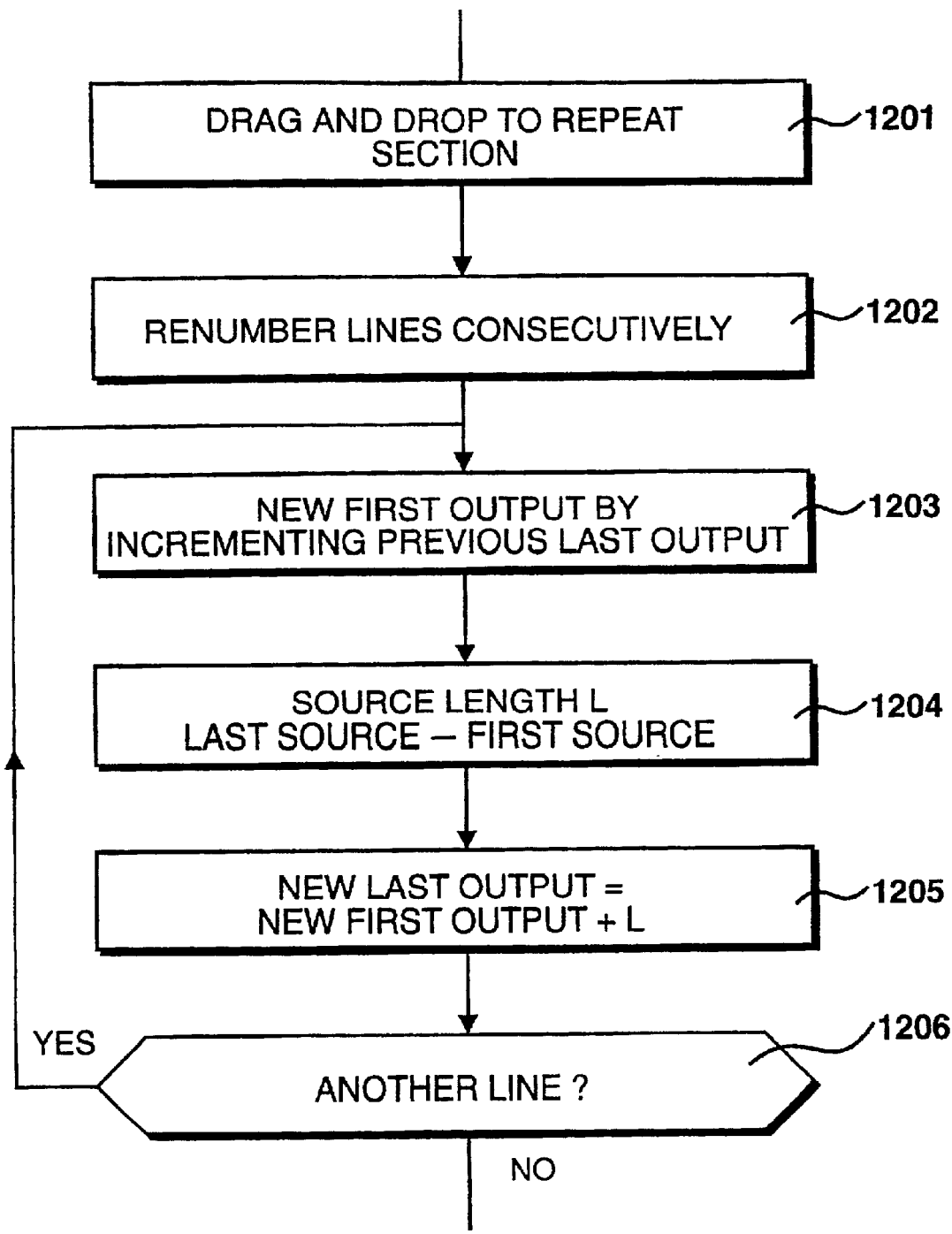
FIG. 12 illustrates the function called to effect the modification illustrated in FIG. 11.

On detecting a modification of edit data to the effect that edit lines have been renumbered, a function call is made, resulting in a function being implemented, as illustrated in FIG. 12.

At step 1201 the function is identified as that being required for a drag and drop to repeat a section and at step 1202 the event numbers in field 703 of the edit data are re-numbered so as to provide consecutive edit lines.

In accordance with this operation, any number of lines present within the edit decision list may be dragged and dropped therefore the updating of timecode forming part of the frame range data may require iterations.

At step 1203 the new first output 709 is considered and is effectively replaced by a previous last output frame in 710 incremented by one frame. Thus, as described with reference to FIG. 11, timecode 1105 is calculated by incrementing time code 1103 by one frame. At step 1204 the source length L is calculated by referring to the original line and by subtracting the first output frame at field 709 from the last output frame at field 710. Referring to the example shown in FIG. 11, this consists of subtracting timecode 1104 from timecode 1107 to give the number of frames present within that edit represented as a source length L.

At step 1205 the new last output in field 710 is calculated by adding the difference L to the new first output. Thus, in the example shown in FIG. 11, timecode 1106 is determined by adding L calculated at step 1204 to timecode 1105.

At step 1206 a question is asked as to whether another line is present and when answered in the affirmative control is returned to step 1203. In the example shown in FIG. 11, the question asked at step 1206 would be answered in the affirmative after processing line 155. Thereafter, steps 1203 to 1205 would be performed to update line 156 whereafter the question asked at step 1206 would be answered in the negative.

What is claimed is:

1. Data processing apparatus, comprising input devices, a storage device, a processing device and output devices; wherein said storage device is configured to receive data representing an edit decision list;

said edit decision list has edit decisions, including a first and a last of said edit decisions, each comprising edit data and frame range data;

an input device applies input data to said processing device in response to user manipulations specifying changes to said edit data; and said processing device is configured to identify time references associated with the identified edit data, to recalculate said frame range data which said identified edit data is applicable to in response to said time references associated therewith, and to write said recalculated frame range data to said storage device to integrate said recalculated frame range data within the boundaries delimited by said first and last edit decisions.

2. In a computer system having a graphical user interface including a display and a user interface selection device, a method of processing data representing an edit decision list equipped with edit decisions, including a first and a last of said edit decisions, wherein said edit decision list is displayed to a user as lines of EDL text having edit data and frame range data;

a user identifies time references associated with the identified edit data and modifies edit data by operation of said selection device; and in response to machine-executable instructions, frame range data is recalculated in response to said manual modification of said edit data to integrate said recalculated frame range data within the boundaries determined by said first and last edit decisions.

3. A method of processing data representing an edit decision list, wherein said edit decision list has edit decisions, a first and a last of said edit decisions, each comprising edit data and frame range data, said method comprising the steps of loading an edit decision list into addressable memory locations;

receiving input data in response to user manipulations of an input device identifying edit data and a modification to said edit data;

identifying time references associated with the identified edit data;

recalculating said frame range data which said identified edit data is applicable to in terms of said time references associated therewith and said user specified modification; and writing said modified frame range data to an addressable storage location to integrate said recalculated frame range data within the boundaries delimited by said first and last edit decisions.

4. A method according to claim 3, wherein said edit data represents an edit type and said frame range data represents a range of source frames, wherein said edit type is modified resulting in modifications being made to said source range, said modifications relating to the recalculation of the range of source frames subsequently to the insertion of a new edit type.

5. A method according to claim 4, wherein said edit type represents a cut and said cut is modified to represent a dissolve or a wipe.

6. A method according to claim 5, wherein said dissolve or wipe frames require input frames from two sources and said source range is modified to represent an overlap of frames for the duration of said wipe or said dissolve.

7. A method according to claim 3, wherein said edit data represents a unique line identifier and said frame range data represents a range of output destination frames, wherein said unique identifier is modified resulting in modifications to said destination range.

8. A method according to claim 7, wherein said identified function is a copy, edit decisions are copied to create additional uniquely identified lines and said destination ranges are modified to specify new output images.

9. A method according to claim 8, wherein the position of said new lines is defined by a process of dragging and dropping an identified range of lines within the existing edit decision list.

10. A method according to claim 3, wherein frame ranges are modified by performing calculations upon time codes defining frames in terms of hours, minutes, seconds and frame numbers.

11. A computer-readable medium having computer-readable instructions executable by a computer such that said computer performs the steps of:

loading an edit decision list equipped with edit decisions, including a first and a last of said edit decisions, each comprising edit data and frame range data into addressable memory locations;

receiving input data in response to user manipulations of an input device identifying edit data and modifications to said edit data;

identifying an associated function of the identified edit data;

recalculating said frame range data which said identified edit data is applicable to in terms of said time references associated therewith and said user specified modification; and writing said modified range data to an addressable storage location to integrate said recalculation frame range data within the boundaries determined by said first and last edit decision.

12. A computer-readable medium having computer-readable instructions according to claim 11, such that when executed by a computer said edit data represents an edit type and said frame range data represents a range of source frames, wherein said edit type is modified resulting in modifications being made to said source range, said modifications relating to the recalculating of the range of source frames subsequently to the insertion of a new edit type.

13. A computer-readable medium having computer-readable instructions according to claim 12, such that when executed by a computer said edit type represents a cut and said cut is modified to represent a dissolve or a wipe.

14. A computer-readable medium having computer-readable instructions according to claim 13, such that when executed by a computer said dissolve or wipe frames require input frames from two sources and said source range is modified to represent an overlap of frames for the duration of said wipe or said dissolve.

15. A computer-readable medium having computer-readable instructions according to claim 11, such that when executed by a computer said edit data represents a unique line identifier and said frame range data represents a range of output destination frames, wherein said unique identifier is modified resulting in modifications to said destination range.

16. A computer-readable medium having computer-readable instructions according to claim 15, such that when executed by computer said identified function is a copy, edit decisions are copied to create additional uniquely identified lines and said destination ranges are modified to specify new output images.

17. A computer-readable medium having computer-readable instructions according to claim 16, such that when executed by a computer the position of said new lines is defined by a process of dragging and dropping an identified range of lines within the existing edit decision list.

18. A computer-readable medium having computer-readable instructions according to claim 11, such that when executed by a computer frame ranges are modified by performing calculations upon time codes defining frames in terms of hours, minutes, seconds and frame numbers.

* * * * *

UNITED STATES PATENT AND TRADEMARK OFFICE
CERTIFICATE OF CORRECTION

PATENT NO. : 6,859,809 B2
DATED : February 22, 2005
INVENTOR(S) : Charles Savoie It is certified that error appears in the above-identified patent and that said Letters Patent is hereby corrected as shown below:

<u>Column 12,</u>
Line 1, "an" should read -- time references --, "function of" should read -- with --.
Line 17, "recalculating" should read -- recalculation --.

Signed and Sealed this

Ninth Day of August, 2005

JON W. DUDAS
*Director of the United States Patent and Trademark Office*